United States Patent [19]
Durrett

[11] Patent Number: 5,964,830
[45] Date of Patent: Oct. 12, 1999

[54] USER PORTAL DEVICE FOR THE WORLD WIDE WEB TO COMMUNICATE WITH A WEBSITE SERVER

[76] Inventor: Charles M. Durrett, 511 George, Birmingham, Mich. 48009

[21] Appl. No.: 08/699,843

[22] Filed: Aug. 20, 1996

Related U.S. Application Data

[60] Provisional application No. 60/002,633, Aug. 22, 1995.

[51] Int. Cl.[6] .............................. G06F 9/00; G06F 9/06
[52] U.S. Cl. .......................... 709/200; 709/203; 709/212; 709/216; 709/217
[58] Field of Search ........................... 395/200.3–200.33, 395/200.36, 200.42, 200.46–200.49, 186, 187.01, 188.01, 200, 670–675; 709/200–203, 212–213, 216–219

[56] References Cited

U.S. PATENT DOCUMENTS

| | | | |
|---|---|---|---|
| 5,287,103 | 2/1994 | Kasprzyk et al. | 340/825.52 |
| 5,455,953 | 10/1995 | Russell | 395/187.01 |
| 5,530,852 | 6/1996 | Meske, Jr. et al. | 395/200.36 |
| 5,572,643 | 11/1996 | Judson | 395/200.48 |
| 5,630,133 | 5/1997 | Hotea et al. | 395/671 |
| 5,721,916 | 2/1998 | Pardikar | 395/200.47 |

*Primary Examiner*—Zarni Maung
*Assistant Examiner*—Bharat Barot
*Attorney, Agent, or Firm*—Mark E. Ogram P.C.

[57] ABSTRACT

An improved network and use of computer based capabilities in which a virtual disk server is employed to give a user portal device access to software object elements and a non-volatile memory. The user portal device includes a rudimentary stand-alone capability. To operate, the user portal device communicates with the virtual disk server and downloads the software object elements which form the operating correlation of objects, the user portal device communicates data and software object elements to the virtual disk server which stores the data and software object elements in its own non-volatile memory such as a disk drive apparatus.

15 Claims, 8 Drawing Sheets

USER PORTAL DEVICE FOR THE WORLD WIDE WEB TO COMMUNICATE WITH A WEBSITE SERVER

This is a continuation-in-part of United States Provisional Patent application Ser. No. 60/002,633, filed Aug. 22, 1995, and entitled "The WebBook—A WWW Surf Board".

BACKGROUND

This invention relates generally to computers and more particularly to computer based devices which are adapted for use on distributed network systems.

The World Wide Web (WWW) presents a user friendly face to the large quantities of information and community present on the Internet.

Currently, general purpose computer hardware and software are used to provide the user access to the WWW. The user employing this technology must be knowledgeable of many complex and technical factors that are not necessary if only WWW access is desired. Also, the user must pay for general purpose capabilities in his/her hardware and software that are unnecessary for WWW access.

The complexities and costs of current technical means of WWW access creates a knowledge and financial barrier to many who could benefit if a simple and inexpensive means of access were available.

It is clear that there is a need for a computer based device which capitalizes upon the strengths of the WWW and other distributed computer systems utilizing similar technologies.

SUMMARY OF THE INVENTION

This invention creates an improved usage of network and computer capabilities by positioning the network as the central element and viewing the various computer based devices as peripherals to the network. Within this overall configuration there are three kinds of computer based peripherals referred to as "user portal devices", "virtual disk server" and "web site server".

The virtual disk server provides user specific non-volatile storage for the user portal device through the network so that physical disk drives are not required on the user portal device. The web site server is any of the computers connected to the network that respond to stand WWW protocols and browsers.

The user portal device includes only a rudimentary stand-alone capability. In the preferred embodiment, the user portal device contains only read-only-memory (ROM) and random-access-memory (RAM) and no physical local disk.

In this preferred embodiment, the ROM contains the initial startup environment and a number of software object elements (SOEs) which are composed of program code and data. The SOEs are capable of behaviors which connect to a virtual disk server for the loading of SOEs maintained by and for the user. The SOEs executed predominately in the preferred embodiment's RAM and form its operating correlation or objects (OCO).

Without the assistance of a virtual disk server and its non-volatile storage, the user portal device is unable to form an OCO sufficiently capable of accessing web site servers and utilizing their content. In one embodiment of the invention, however, a physical disk can be locally added to the user portal device to execute the storage role of the virtual disk server.

Further, in one embodiment of the invention, the user portal device is able to obtain additional SOEs from a distributed computer system (such as the World Wide Web or Internet) once its OCO has been sufficiently established to support the technical protocols needed to effect such an access. The virtual disk server can be used for further connectivity to the network or the user portal device can go directly to a web site server without the virtual disk server's further support.

As desired and direct by the user of the user portal device, SOEs can be preserved in the user's storage maintained by the virtual disk server for later use in establishing a future OCO.

The present invention is a special purpose information appliance specifically designed to access the information resources of the WWW including SOEs present therein. The apparatus is a small portable unit consisting of an integral display and keyboard about the same size as a notebook computer. In one embodiment the integral display and keyboard are deleted and an external monitor and keyboard are used.

Preferably, the basic unit has between 8 and 32 megabytes of RAM and 1–4 megabytes of ROM. There is no local hard drive for non-volatile storage unless the user elects to install such capability.

The base user portal device is essentially useless unless it is connected to a network having at least a virtual disk server. The user has access to virtual disk drives that are independent of the specific user portal device being used. The provider of the virtual disk server may also elect to provide other virtual support for legacy operating systems such as Windows, MacOS and Unix variants should sufficient customers be interested in having these capabilities.

The Central Processing Unit (CPU) of the preferred embodiment is preferably inexpensive but computationally powerful. In this embodiment the processor is a stack based machine (SBM) rather than a register based machine (RBM). The invention relies on an SBM to effectively support the software technology used for the SOEs (Java) and to efficiently execute the SOEs forming the OCO.

In the preferred embodiment communication between the user portal device and the virtual disk server is protected by encryption. The keys used for this encryption are contained in a physical token such as a special removable ROM as indicated by the drawings. When a user connects with the virtual disk server standard account and password mechanisms are used to identify the user to the virtual disk server. After successful identification the virtual server connects the user portal device with the encrypted storage maintained for the user.

Virtual disk information is only realizable in-the-clear at the user portal device and only if the keys match those used to record the virtual disk information. The virtual disk server is unable to decrypt the user information being maintained in a virtual disk.

The user portal device has a numerically unique identification established a manufacturing time. This value is used by the virtual disk server to deny service to user portal devices that may have been stolen, misplaced or reported as destroyed.

The preferred embodiment of this invention includes a variety of capabilities:

1. The unit is a special purpose device produced only to exploit the information and SOEs available in the WWW and similar networks. It is therefore less expensive, simpler in both construction and operation, and more efficient than other more general purpose and complex technical means of utilizing the WWW.

2. The need for local physical disk drives is removed.

The user saves SOEs and other information without worrying about data backups or disk space problems.

3. The user's information is protected and private. By employing an identity based key approach established by a physical token, the unit does not require the user to use a specific user portal device but can use any user portal device as defined by this invention. Local disk drives that the user may elect to install are also protected by encryption as well as mirrored by the virtual disk server. The built-in encryption and data protection capabilities makes this invention suitable for WWW based commerce and other sensitive applications.

4. The user portal device's operation is determined by the SOEs making up its OCO at any point in time. Because SOEs are assembled dynamically, application software updates are transparently applied to the user's environment. Also long term enhancements made to the capabilities being offered by Web site servers can be communicated dynamically through the network permitting users to remain current with the evolution of WWW utility.

5. The user portal device will efficiently execute SOEs because its CPU is a SBM. The software technology underlying the SOEs, Java, is also stack based so the user portal device will always have a technical performance advantage.

6. The user portal device is physically secure because its economic value can be reduced by denial of service from virtual disk servers once it reported stolen. Additionally, information kept on local disk drives is encrypted so that it will not be compromised if the unit is lost.

While those of ordinary skill in the art recognize a variety of configurations for the local computer, the following describes the specification for the preferred embodiment:

| | |
|---|---|
| Processor | Patriot Scientific (ShBoom), 75–100 mhz; |
| Memory | 4–8 MB DRAM, .5 MB ROM/EPROM; |
| Video | VGA 640 × 280 (Internal 6–7") LCD backlit (preferably color), VGA 640 × 280 (External - DB15), NTSC, Video - RCA Phono jack; |
| Keyboard | Internal - elastomer - 64–80 keys, External - AT standard; |
| Mouse | Internal - Trackpad + 3-button, External - PS/2 standard 2-button; |
| Sound | Input: Internal - Stereo Microphones, External - Stereo miniature phono jack, Output: Internal - Stereo Speakers, External - Stereo miniature phono jack, External - Single channel RCA Phono; |
| Authentication | Dallas Semiconductor "Touch Memory"; |
| Network | Power line or UTP Ethernet; |
| Expandability | 4 Type III PC Cards, 1 SIMM socket; |
| Power | AC Power adapter - 6V 1.0–1.5 A, Battery - 6V 1–2 AH with Motorola Cell phone compatible connector. |

Another embodiment of the invention uses the following configuration:

| | |
|---|---|
| Processor | Patriot Scientific (ShBoom), 100–150 mHz; |
| Memory | 8–12 MB DRAM, .5 MB ROM/EPROM; |
| Video | SVGA 800 × 600 (External - DB15); |
| Keyboard | External - AT standard; |
| Mouse | External - PS/2 standard 2-button; |
| Sound | Input: Internal - Stereo Microphones External - Stereo miniature phono jack Output: Internal - Stereo Speakers External - Stereo miniature phono jack |
| Authentication | Dallas Semiconductor "Touch Memory"; |
| Network | UTP Ethernet; |
| Expandability | 4 Type III PC Cards, 1 SIMM socket; |
| Power | AC Power adapter - 6V 1.0–1.5 A. |

Still another embodiment uses the following specification:

| | |
|---|---|
| Processor | Patriot Scientific (ShBoom), 100–150 mHz; |
| Memory | 8–12 MB DRAM, .5 MB ROM/EPROM; |
| Video | SVGA 800 × 600 (Internal 6–7") Color LCD backlit, SVGA 800 × 600 (External - DB15), NTSC Video - RCA Phono jack; |
| Keyboard | Internal - elastomer - 64–80 keys, External - AT standard; |
| Mouse | Internal - Trackpad + 3-button, External - PS/2 standard 2-button; |
| Sound | Input: Internal - Stereo Microphones External - Stereo miniature phono jack, Output: Internal - Stereo Speakers External - Stereo miniature phono jack External - Single channel RCA Phono; |
| Authentication | Dallas Semiconductor "Touch Memory"; |
| Network | Power line or UTP Ethernet; |
| Expandability | 4 Type III PC Cards, 1 SIMM socket; |
| Power | AC Power adapter - 6V 1.0–1.5 A, Battery - 6V 1–2 AH, Motorola Cell phone compatible connector. |

The invention, together with various embodiments thereof, will be more fully explained by the attached drawings and the following descriptions.

DRAWINGS IN BRIEF

FIG. 1 is a perspective view of an embodiment of the invention illustrating its linkage with the World Wide Web.

FIG. 2 is a block diagram of the preferred embodiment's electronic interconnection.

FIGS. 3A, 3B, and 3C are frontal, perspective (open), and perspective (closed) views respectively of the preferred embodiment of the invention.

FIG. 4 is a frontal view of an alternative embodiment of the invention.

FIGS. 5A and 5B are schematic and exploded views respectively of an alternative embodiment of the invention.

FIG. 6A is a flow-chart of the operation of the preferred local computer.

FIG. 6B is a flow-chart of the operation of the preferred access provider computer.

FIG. 6C is a flow-chart of the virtual disk server responding to a connection.

FIG. 6D is a flow-chart for the operation of the virtual disk server once a user has been validated.

Figure 1:
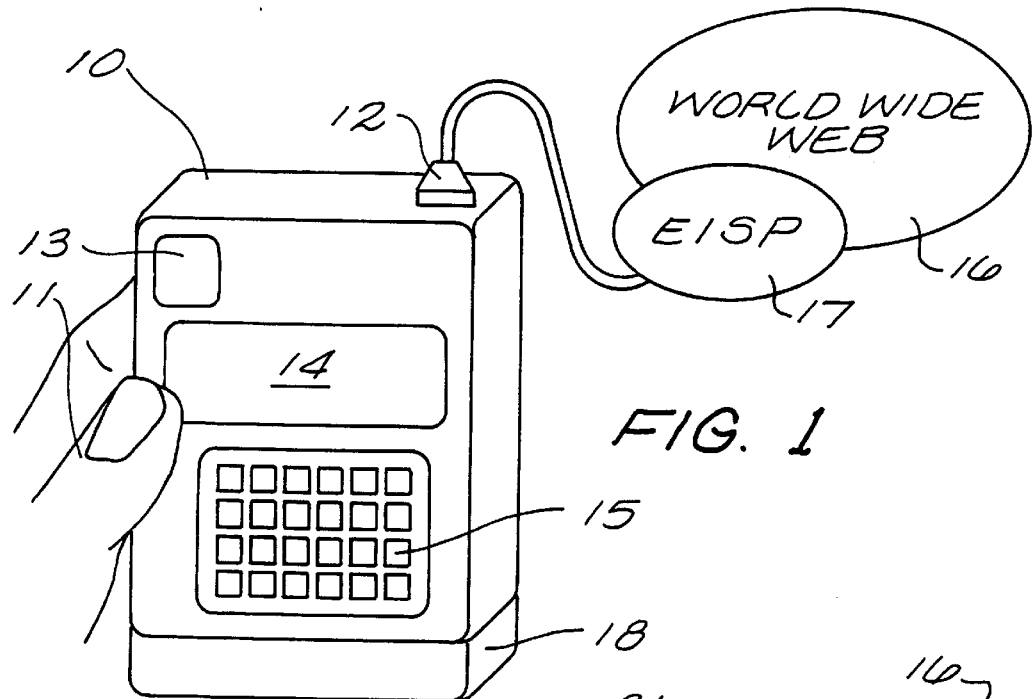
FIG. 1 is a perspective view of an embodiment of the invention illustrating its linkage with the World Wide Web.

Local Computer 10 is easily held by operator 11 and is connected to the World Wide Web 16 via a PCMCIA device (i.e. modem 12) dealing through the Internet Service Provider (ISP) 17.

Operator 11 identifies himself via key 13 which, in this embodiment, scans the fingerprint of the user 11 for proper identification. Other forms of key 13 are obvious to those having ordinary skill in the art.

Screen 14 is used to visually communicate information to user 11 while keyboard 15 is used for operator entry of data and instructions.

Battery 18 provides power for Local Computer 10.

Figure 2:
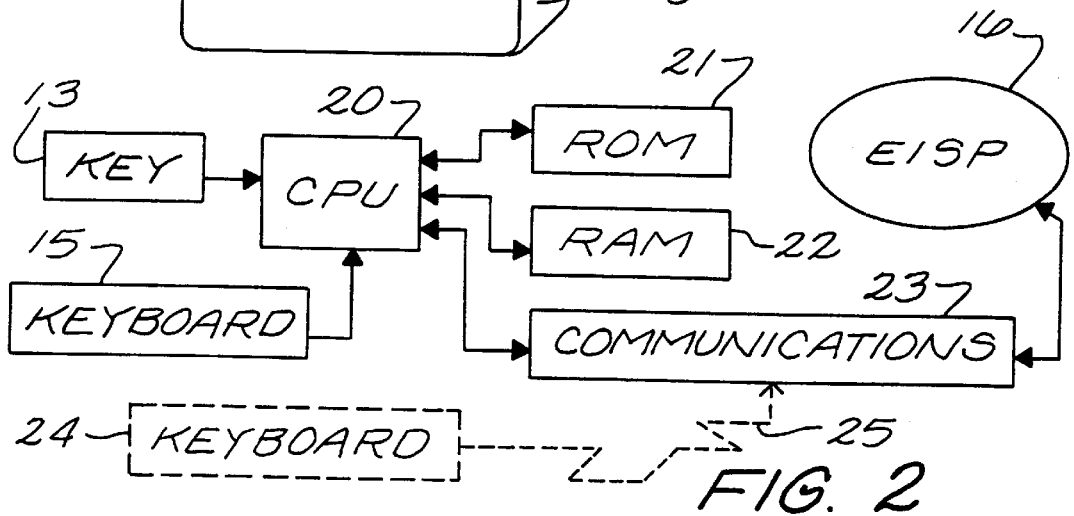

FIG. 2 is a block diagram of the preferred embodiment's electronic interconnection.

At the center of the operation is CPU 20 which receives operator data via keyboard 15 once proper operator identification has been established using data from key 13.

Operational instructions for CPU 20 are utilized from a variety of sources including Read Only Memory (ROM) 21, Random Access Memory (RAM) 22, and via communications 23. Note, no hard-drive is included as data storage normally associated with an on-board hard-drive is kept on the ISP 17.

Communications 23 acts as the interface between CPU 20 and the ISP 17. Communications 23, in this embodiment includes a modem for telephone connection to ISP 17.

Further, Communications 23 also is the interface with optional keyboard 24 which communicates, in this embodiment using infrared link 25.

This entire system is readily portable and provides quick and secure access to the World Wide Web.

Figure 3A:
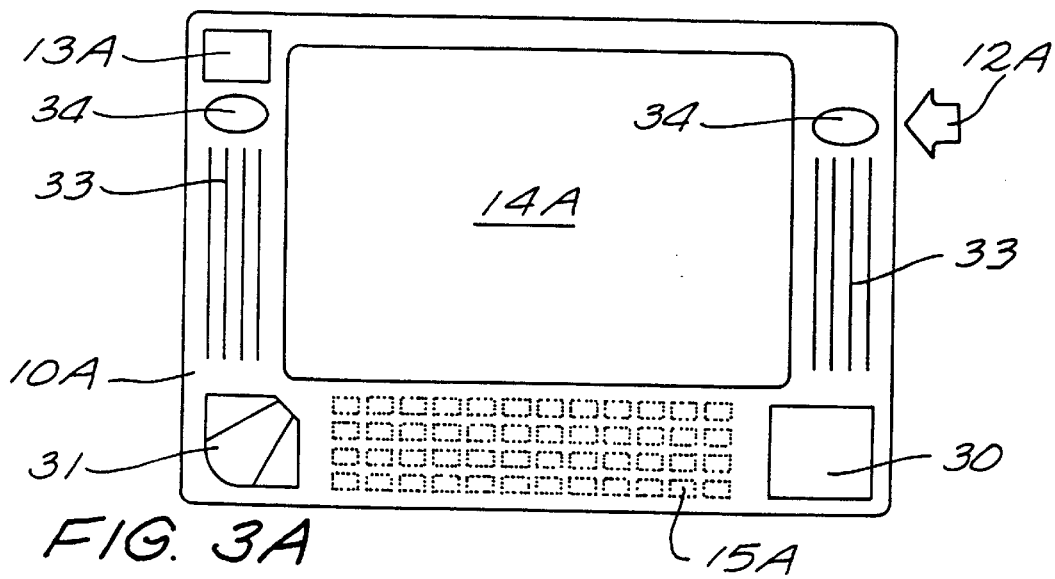
Figure 3B:
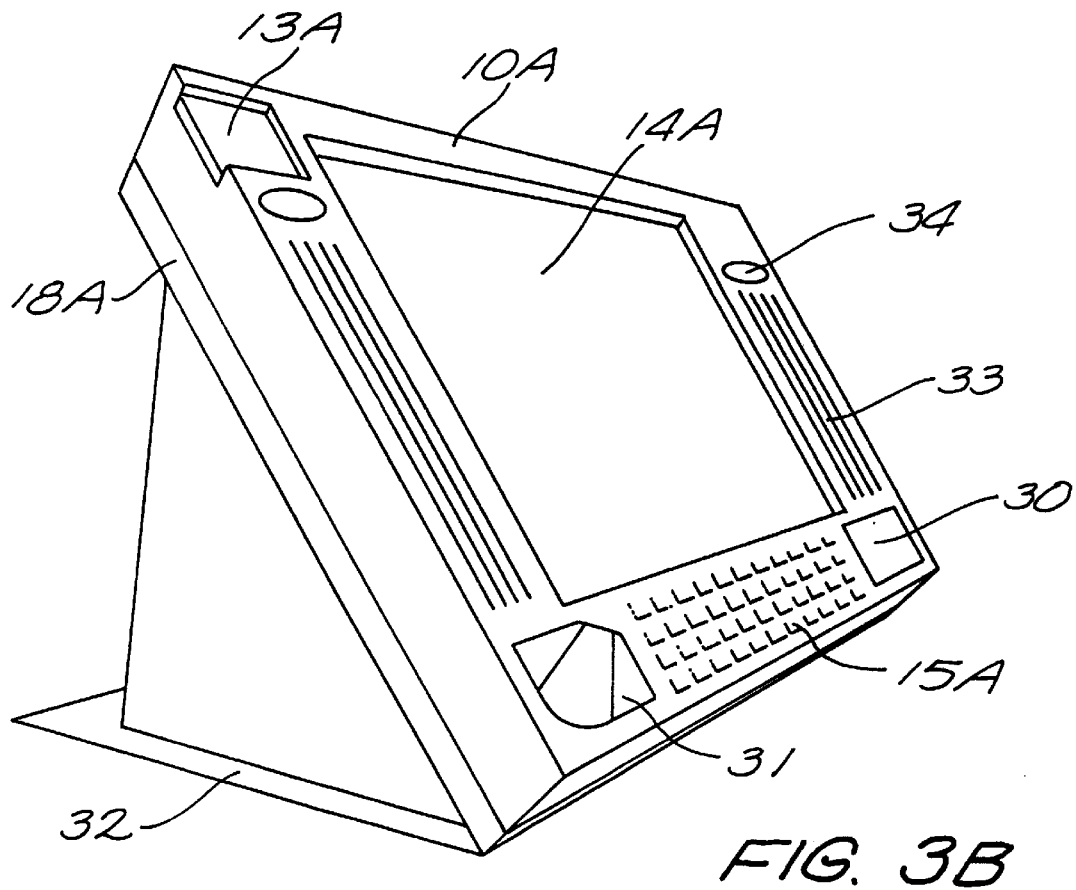
Figure 3C:
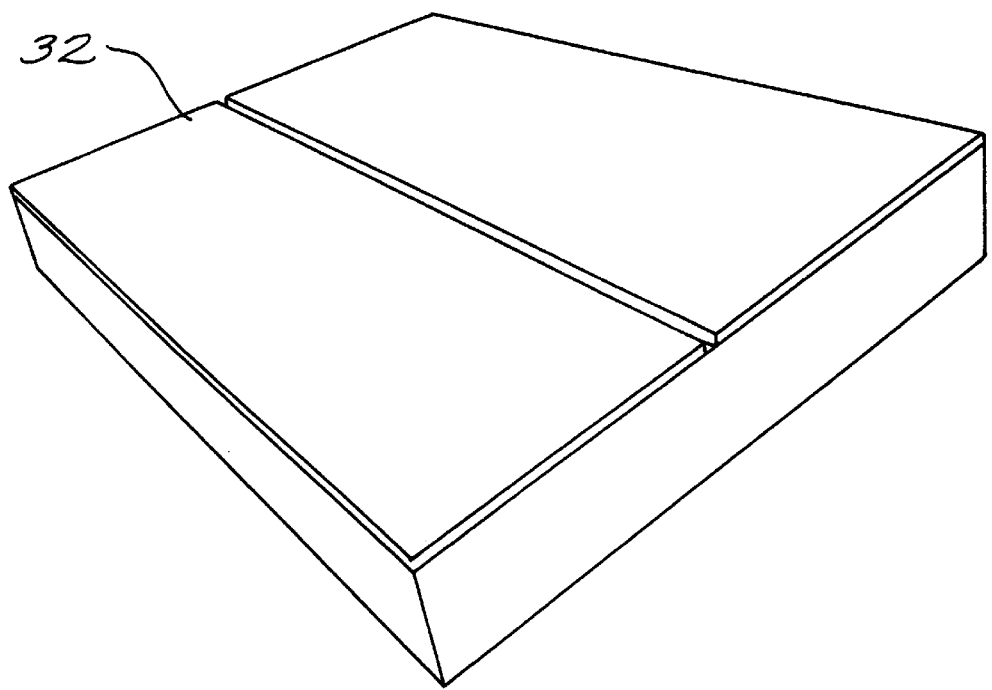

FIGS. 3A, 3B, and 3C are frontal, perspective (open), and perspective (closed) views respectively of the preferred embodiment of the invention.

Local computer 10A has as its primary communication mechanisms, screen 14A and speakers 33. Operator data is entered into local computer 10A via keyboard 15A, mouse 31, microphone 34, and pointing device 30.

In this embodiment, keyboard 15A is a membrane type in which individual keys are activated using a pen tip or other similar tool.

External data is received via interconnect 12A which communicates, in the preferred embodiment, via the phone lines with the access provider computer.

Logging into the access provider computer and for activating local computer 10A is accomplished via fingerprint key 13A. Fingerprint key 13A scans the user's fingerprint and correlates this to a file which is stored within the non-volatile memory of the access provider computer. In one embodiment, the "fingerprint" data serves as a "key" to de-crypt the data stored within the non-volatile memory.

Battery 18A provides the electrical power for the entire local computer 10A and is ideally rechargeable.

Cover 32 serves as a cradle (as illustrated in FIG. 3B) and also as a protective cover for the face of local computer 10A (as shown in FIG. 3C).

Figure 4:
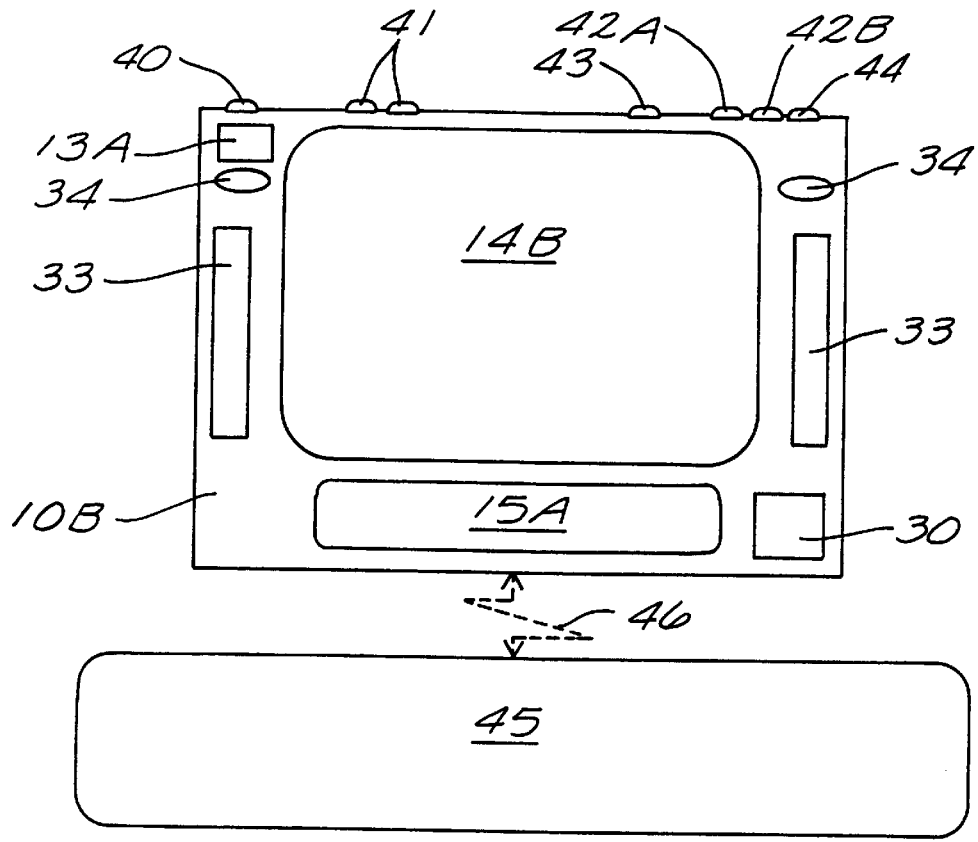

FIG. 4 is a frontal view of an alternative embodiment of the invention.

This embodiment of the local computer 10B incorporates the use of screen 14B, speakers 33, microphone 34, pointing device 30 and authentication/key generation 13A.

This embodiment of the invention also incorporates the ability to accept keyed input not only from membrane keyboard 15A but also from a full sized keyboard 45 which communicates with the local computer 10B via an infrared link 46. This linkage of a full-sized keyboard 45, in conjunction with linkage with a full-sized monitor via VGA output 44, permits the user to easily enter data for use by the local computer.

In this application, where the user has linked a full sized monitor and a full sized keyboard, local computer 10B is able to down-load from the access provider computer (or from another source on the Internet) software to operate a variety of programs including: word-processing, spread sheets, and computer-aided-design. These programs would not be resident on local computer 10B but would be obtained when needed and would utilize the non-volatile memory of the access provider computer.

In this context, the access provider computer is a computer which is accessible to local computer 10B, whether the access provider computer is linked via a direct phone line (a dedicated communications channel) or through the internet/ World Wide Web.

Other attributes of this embodiment include the ability to accept external power 40 to either operate the apparatus or to recharge the internal batteries (not shown).

Game ports 41 permit the local computer 10B to interface with a variety of apparatus.

Audio and visual input and output is accomplished in this embodiment via stereo In/Out 43, TV input 42A and TV output 42B. These provide another source of communication from the local computer 10B and the operator as well as mechanisms for the acceptance of input data which is storable in the non-volatile memory of the access provider computer (not shown).

Figure 5A:
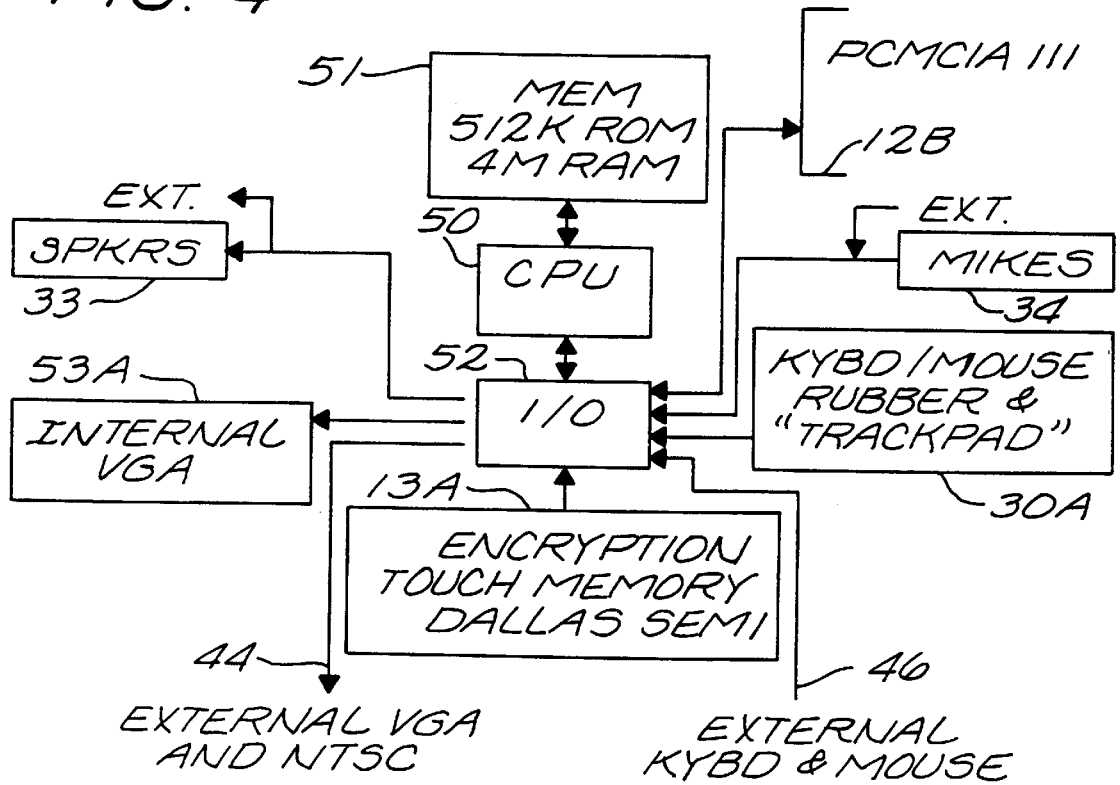
Figure 5B:
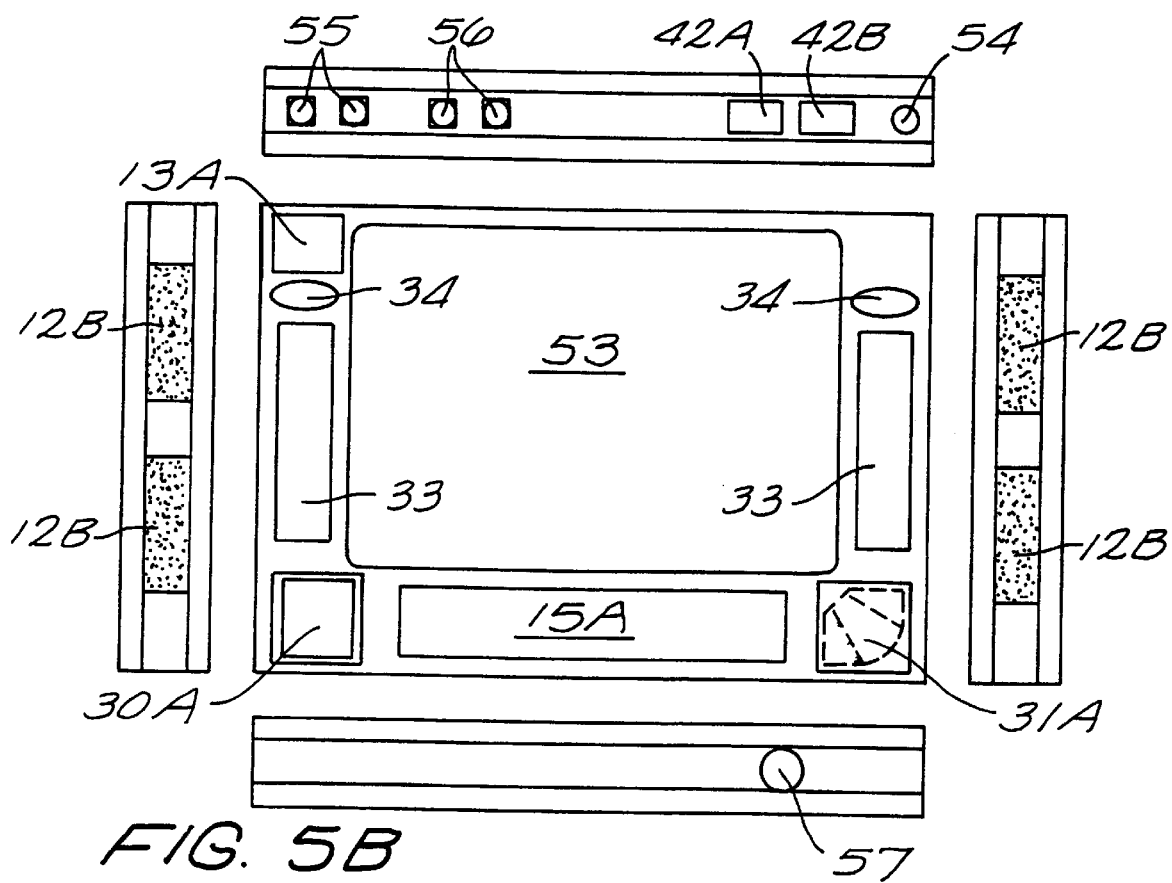

FIGS. 5A and 5B are schematic and exploded views respectively of an alternative embodiment of the invention.

Referring to FIG. 5A, a block diagram of an embodiment of the invention, communication to and from the unit is centralized through an Input/Output (I/O) apparatus 52. I/O 52 accepts data input from a variety of sources including interconnects PCMCIA III 12B, microphones 34, mouse/ trackpad 30A, external mouse and keyboard 46, and the encryption touch memory 13A. Output from I/O 52 is communicated to speakers 33, the internal VGA driver 53, external VGA 44, and interconnects 12B.

CPU 50 is preferably a commercially available microprocessor with enhanced capabilities and with extensive computing power. CPU 50 receives and transmits its data for external use via I/O 52. Internally used data is stored in memory 51 which, in this embodiment, consists only of a Read-Only-Memory (ROM) and a Random-Access-Memory (RAM). While the ROM size is kept extremely modest, preferably at only 512k, the RAM size is extended to four megabytes to give CPU 50 maximal operating capabilities.

With reference to FIG. 5B, a view of six different sides of the alternative embodiment, the location of the various interconnects is shown.

Speakers 33 and microphones 34 are located on each side of screen 53. At three corners are located the authentication keypad 13A, touchpad 30A, and three way mouse 31A. Below screen 53 is the membrane keyboard 15A.

On both the right and left side panels are located interconnects 12B which allow the apparatus to be connected to a variety of peripheral mechanisms.

The front panel contains a connector 57 for a remote keyboard to be attached to the computer.

The rear panel includes audio-in connectors 55, audio-out connectors 56, television-in connector 42A, and television-out connector 42B. On/off switch 54 is used to start and stop the machine.

Figure 6A:
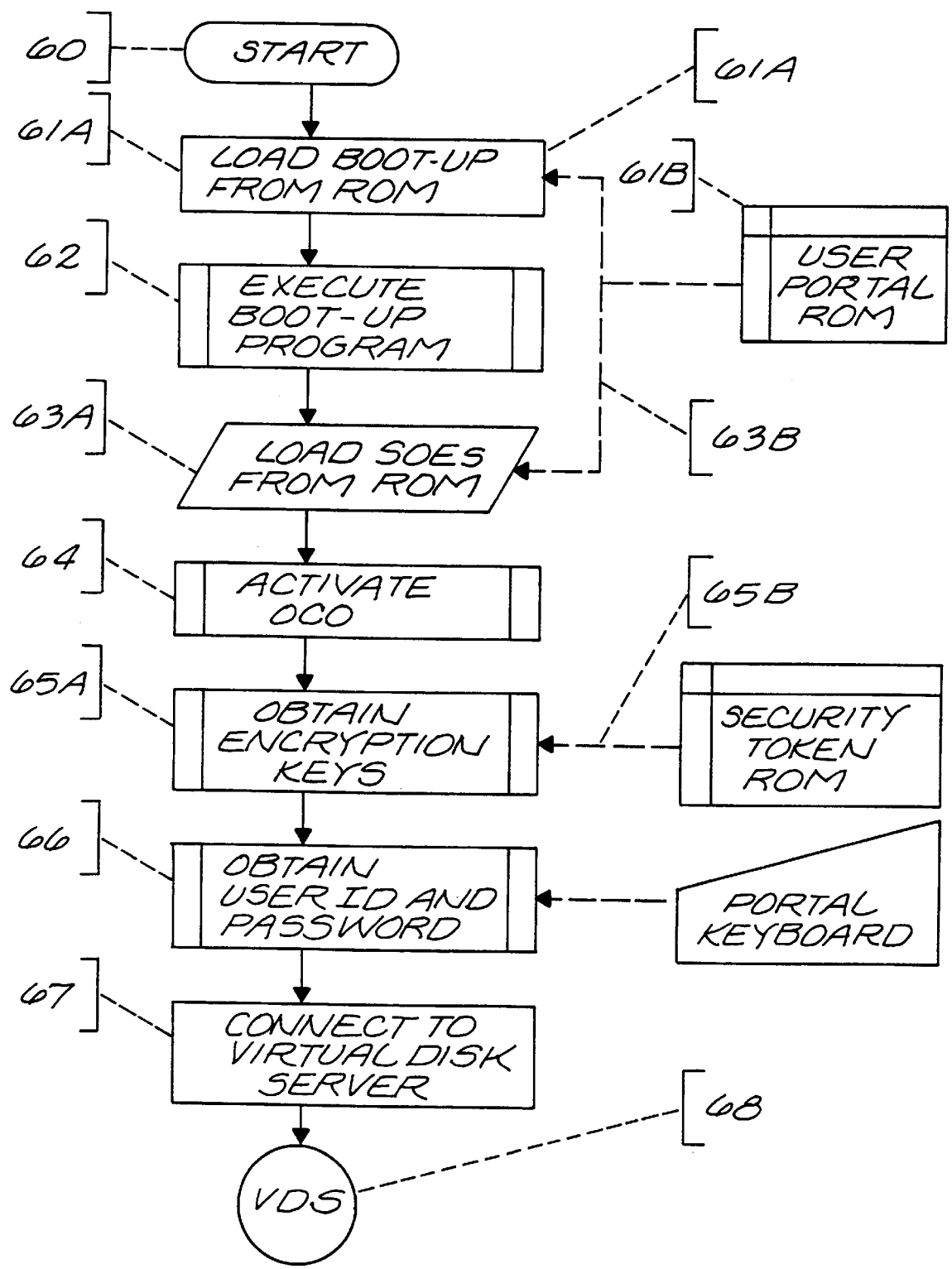

FIG. 6A is a flow-chart of the operation of the user portal device from boot-up to connection with a virtual disk server.

After start 60, the boot-up program 61a is loaded from the portal ROM 61b and executed by the portal computer 62.

The boot-up program creates the environment for the software object elements that make up the operating correlation of objects and loads 63b the initial set of software object elements 63a from the portal ROM 61b. The boot-up program then activates the operating correlation of objects 64 which then control the remaining operation of the portal device. The software object elements are the same kind of artifacts as the software object elements originating from either the virtual disk server or from Web site servers.

In the preferred embodiment, the operating correlation of objects then obtains the encryption keys 65A stored in the security token ROM 65B. These keys are used to encrypt and decrypt the information stored by the virtual disk server for the user.

The user ID and password are queried from the operator 66 and the connection is then made with the virtual disk server 67.

Figure 6B:
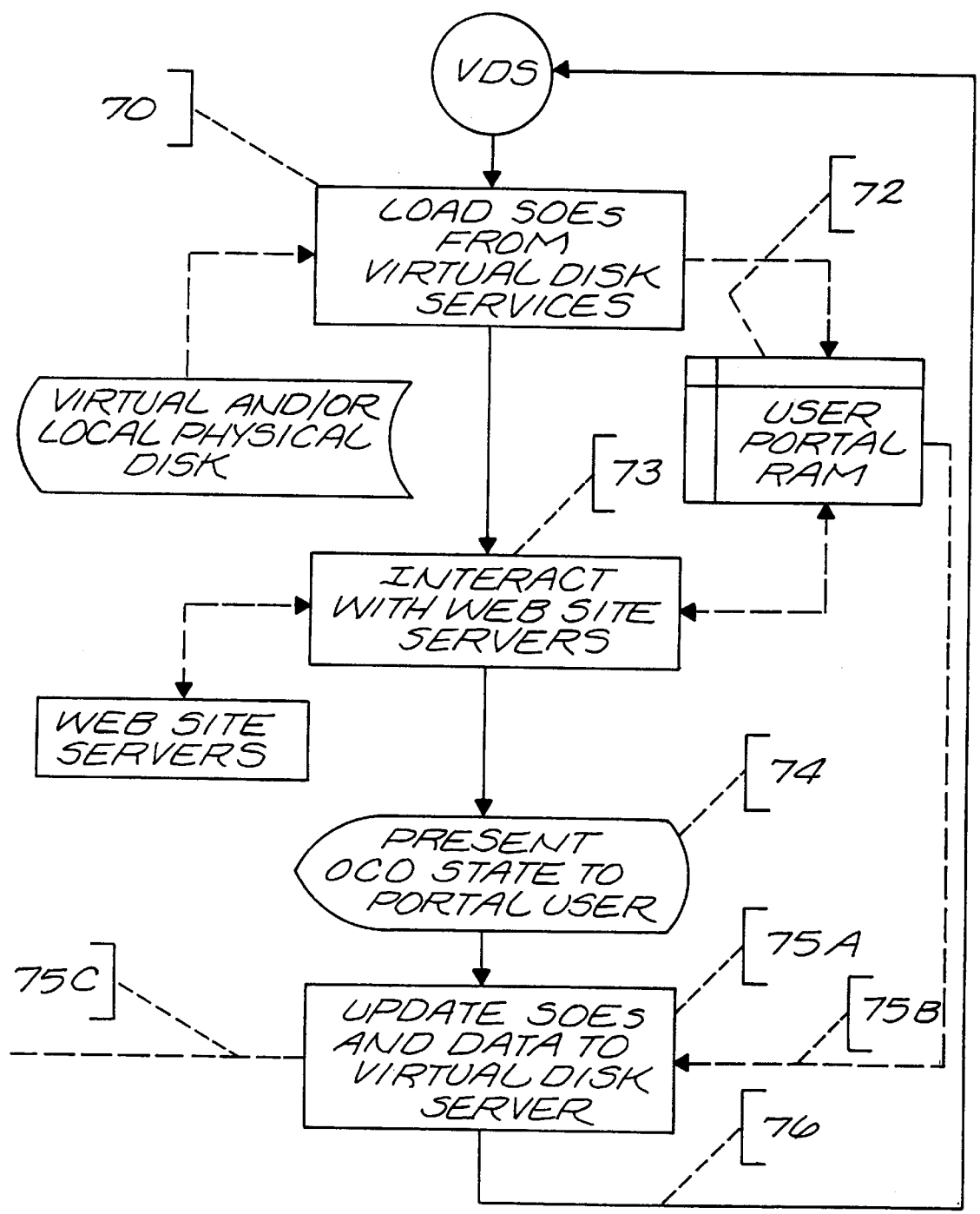

FIG. 6B is a flow-chart of the operation of the user portal device after connection has been made with the virtual disk server.

The user portal device operates as a continuation 69 from the previous operation. That is, a connect is treated as a restoration of service after an interruption.

Software object elements needed for the operation of the user portal device are loaded 70 from the user's virtual disk 71 into the RAM in the portal device 72. These software object elements are those not already present in the user portal device or newer elements than those present in the portal device.

Interaction with Web site servers continues in response to operator actions and preferences 73. Data and software object elements from this interaction are recorded temporarily in the portal device RAM 72. Software object elements compose not only the operating correlation of objects that act like an operating system for the user portal device but also provide functionality similar to various conventional application programs such as Web browsers, word processors, spread sheets and others.

The user portal device continuously presents the state of its operating correlation of objects to the operator 74. Updated software object elements and data in the portal device RAM 75b are store in the virtual disk 75c by the operating correlation in the portal device 75a.

The operating correlation then loops 76 back to the beginning of FIG. 6B.

Figure 6C:
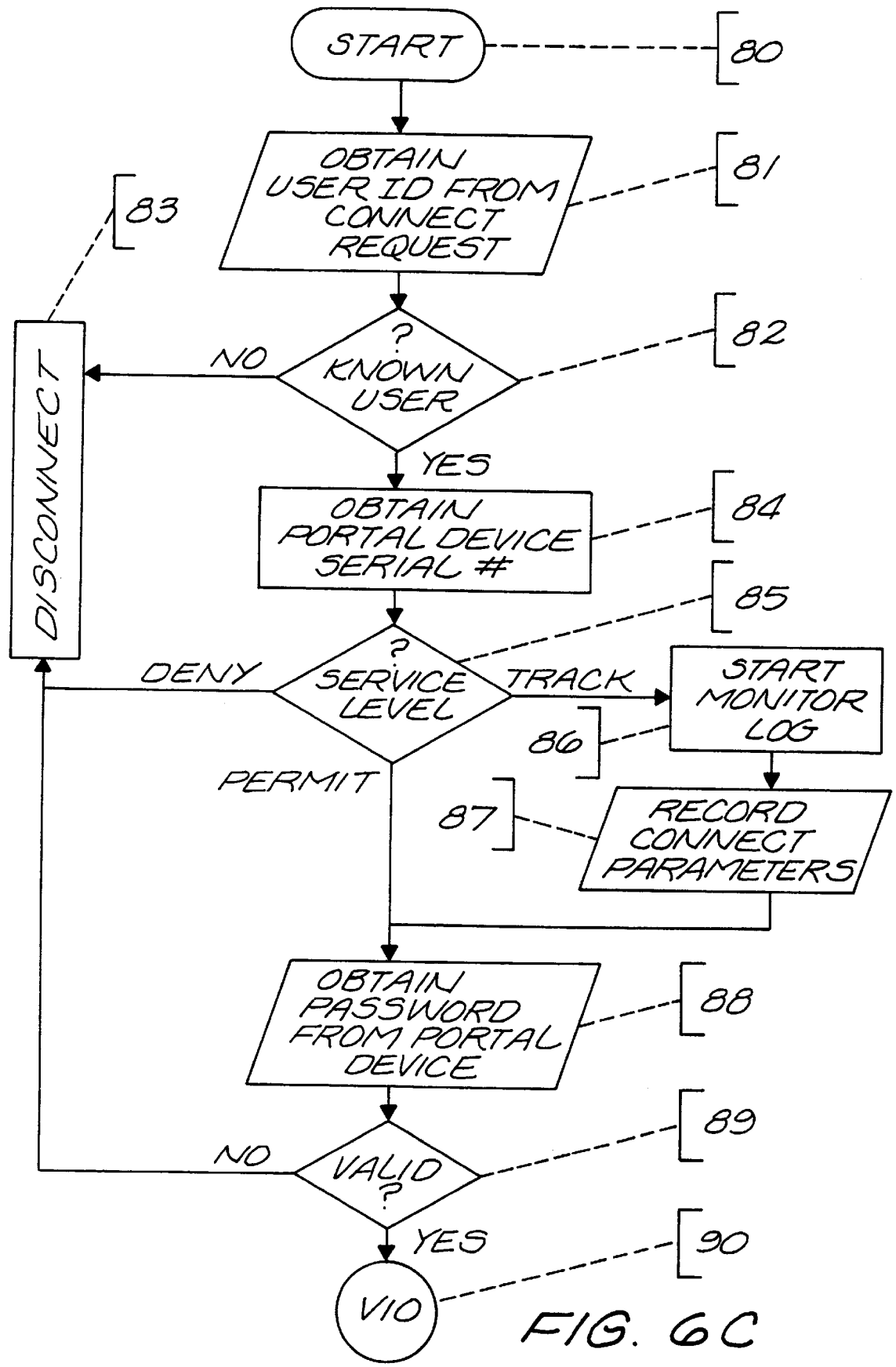

FIG. 6C is a flow-chart of the virtual disk server responding to a connection.

After start 80, the user ID is extracted from the connection request 81 and compared with a list of know users 82. If the user is not know then the virtual disk server disconnects 83.

If the user ID is known to the virtual disk server, the serial number of the user portal device is examined 84 to determine the service level defined for the device. Decision 85 determines if service is to be denied (eg, stolen unit) then the virtual disk server disconnects 83. If the service level is for tracking (eg, trying to locate a missing portal device based on usage) a monitor log is started 86 for the connection and the connect parameters (such as originating phone number is dial-in access is being made) recorded 87.

If the service level is permit or tracking the virtual disk server then requests the password from the portal device 88.

Figure 6D:
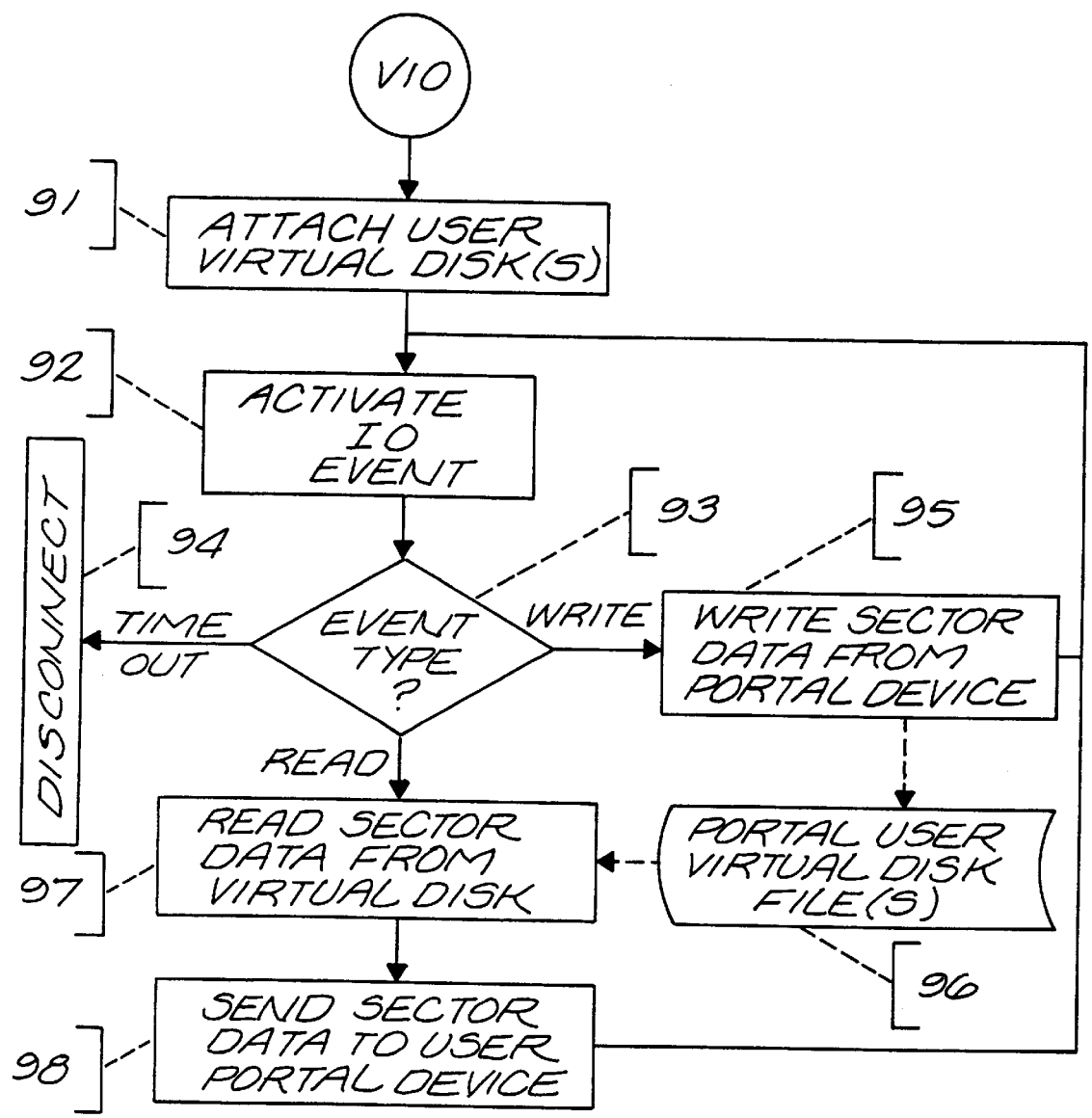

The password is check for validity 89 and if it is invalid a disconnect occurs 83; otherwise, the program connects 90 to FIG. 6D.

If the password is correct then FIG. 6D applies.

FIG. 6D is a flow-chart for the operation of the virtual disk server once a user has been validated.

The user is attached to the virtual disk(s) 91. This peruser non-volatile storage will typically be files on the computer system hosting the virtual disk server.

After attachment, the virtual disk server will await an input/output event from the user portal device 92. After a period of time without any event 93, the virtual disk server will disconnect 94.

If the event type 93 is a write it is accompanied by the encrypted data to be written 95. The data is placed in the virtual disk of the user 96. If the event type 93 is a read, the virtual disk server reads the data from the virtual disk 97 and sends it to the user portal device 98.

After processing an input-output event, the virtual disk server awaits the next event 92.

In this manner, the operating correlation of objects is supplemented and increased by interacting with Web site servers in response to user preferences and operations. The user portal device grows in capability and utility over time and is not limited to the software packaged with the portal device or by the software object elements stored by the virtual disk server.

It is clear that the present invention creates a highly improved means for accessing and using the world wide Web.

What is claimed is:

1. A system of computers comprising:
    a) a communication system for transmitting electronic data from one location to another location;
    b) an access provider computer having,
        1) a non-volatile memory having stored therein,
            A) data defining software programs requiring use of the non-volatile memory, and,
            B) remotely generated data,
        2) an access provider operational means for,
            A) receiving data from said communication system,
            B) communicating selected groupings of said software programs and remotely generated data to said communication system, and,
            C) storing in said non-volatile memory, data received from said communication system as remotely generated data; and,
    c) a hand-held local computer having,
        1) a volatile memory means for storing a software program,
        2) communication means for accessing said communication system,
        3) operator input means for establishing operator generated data,
        4) a local computer operational means for,
            A) via said communication means, receiving a selected software program from the non-volatile memory of said access provider computer system,
            B) storing said selected software program in said volatile memory means,
            C) executing said software program in said volatile memory, and,
            D) via said communication means, communicating selected data generated by said software program and said operator input means to said access provider computer for storage in said non-volatile memory of said access provider computer.

2. The system according to claim 1 wherein:
a) the non-volatile memory of said access provider computer includes data defining authorized serial numbers, and identification data; and,
b) the access provider operational means includes means for comparing received data to said authorized serial numbers and identification data from said non-volatile memory means.

3. The system according to claim 2 wherein the local computer operational means of said hand-held local computer includes means for communicating operator generated data to said access provider computer via said communication system.

4. The system according to claim 1 wherein said hand-held local computer further includes a read-only memory containing programs and identification data stored therein, and wherein said operator generated data includes identification data stored within said read-only memory.

5. The system according to claim 1 further including a power source contained within said hand-held local computer for powering said volatile memory, said communications means, and said operational means.

6. The system according to claim 5 wherein said hand-held local computer further includes:
a) a visual display apparatus for communication of data from said operational means to an operator; and,
b) a phone interconnect member for connecting a phone line to said communication means.

7. The system according to claim 1 wherein said hand-held local computer further includes a read-only-memory containing data indicative of a boot-up program, and wherein said operational means of said hand-held local computer includes means for:
a) installing said boot-up program from said read-only-memory into said volatile memory; and,
b) executing said boot-up program in said volatile memory.

8. The system according to claim 7 wherein said volatile memory and said read-only-memory constitute an entire data memory of said hand-held local computer.

9. A system of computers comprising:
a) a network of computers providing electronic data;
b) a network communication system for transmitting electronic data from one computer to another computer within said network of computers;
c) a dedicated communication means for communicating data from a single computer to another single computer;
d) an access provider computer having,
  1) a non-volatile memory having stored therein data defining software programs requiring use of the non-volatile memory, and remotely generated data,
  2) network accessing means for retrieving data from and communicating data to said network of computers via said network communication system,
  3) an access provider operational means for,
    A) receiving and transmitting data from and to said communication system,
    B) communicating selected groupings of said software programs and remotely generated data to a remote computer via said dedicated communication means, and,
    C) storing in said non-volatile memory, data received from said dedicated communication means as remotely generated data; and,
e) a hand-held local computer having,
  1) a volatile memory for storage of a software program,
  2) communication means for accessing said dedicated communication means,
  3) operator input means for establishing operator generated data, and,
  4) a local computer operational means for,
    A) via said dedicated communication means, receiving a selected software program from said access provider computer system,
    B) storing said selected software program in said volatile memory,
    C) executing said software program in said volatile memory,
    D) via said access provider computer, receiving data from said network of computers, and,
    E) via said dedicated communication means, communicating selected data generated by said software program, said operator input means, and said data from said network of computers, to said access provider computer for storage in said non-volatile memory of said access provider computer.

10. The system of computers according to claim 9 wherein:
a) the non-volatile memory of said access provider computer includes data defining authorized serial numbers, user identifications; and,
b) the access provider operational means of said access provider computer includes means for comparing received data from said hand-held local computer to said authorized serial numbers.

11. The system of computers according to claim 10 wherein the local computer operational means of said hand-held local computer includes means for communicating operator generated data to said computer system via said dedicated communication means.

12. The system of computers according to claim 11 wherein said hand-held local computer further includes a read-only-memory containing data and programs and wherein said operator generated data includes identification data stored within said read-only-memory.

13. The system of computers according to claim 9 wherein said hand-held local computer further includes:
a) a visual display apparatus connected to said operational means for communicating data from said operational means to an operator; and,
b) a modem communicating between said operational means of said hand-held local computer and said dedicated communication means.

14. The system of computers according to claim 9 further including a read-only-memory containing a boot-up program and wherein said operational means includes means for:
a) installing said boot-up program from said read-only-memory into said volatile memory; and,
b) executing said boot-up program in said volatile memory.

15. The system of computers according to claim 14 wherein said volatile memory and said read-only-memory constitute an entire data memory of said hand-held local computer.

* * * * *